April 25, 1967     H. M. SELLERS     3,316,154
CHEWING GUM CONTAINING GAS AND A MEDICAMENT
Filed July 12, 1963
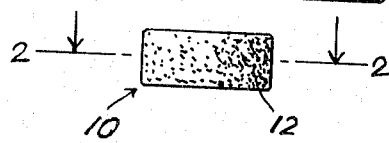
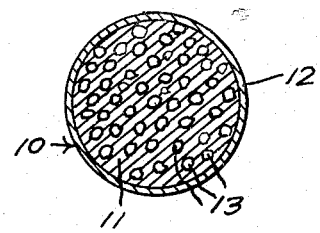
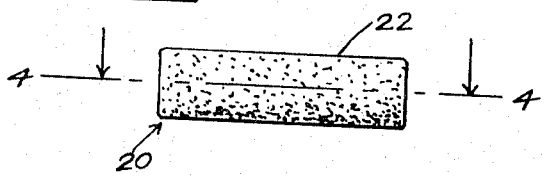
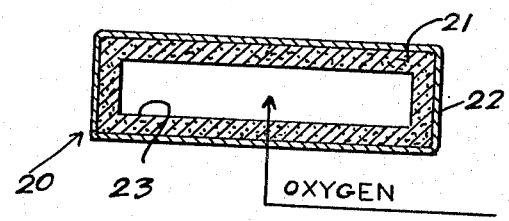
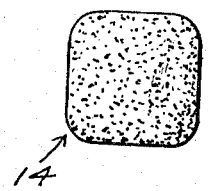
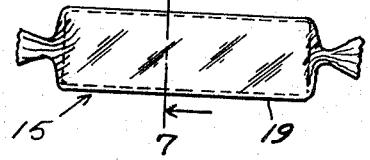
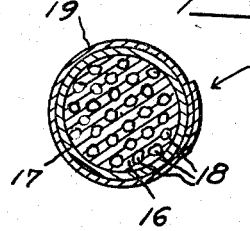
INVENTOR
HAROLD M. SELLERS
BY John N. Randolph
ATTORNEY

United States Patent Office 3,316,154
Patented Apr. 25, 1967

3,316,154
CHEWING GUM CONTAINING GAS
AND A MEDICAMENT
Harold M. Sellers, Houston, Tex.
(214 Clay St., Sharpsburg, Pa. 15215)
Filed July 12, 1963, Ser. No. 294,538
7 Claims. (Cl. 167—82)

This invention relates to a piece of chewing gum of a size so that it can be conveniently placed in the mouth and chewed and wherein the mass of chewing gum contains an entrapped gas which is released therefrom by the kneading of the chewing gum, incident to the chewing thereof.

More particularly, it is an aim of the invention to provide a chewing gum wherein the entrapped gas upon being released into the mouth will be beneficial to the person chewing the gum.

A further object of the invention is to provide an item or piece of chewing gum which is so constructed that the entrapped gas or gases contained therein will be released gradually into the mouth during chewing of the gum.

Various other objects and advantages of the invention will hereinafter become more fully apparent from the following description of the drawing, illustrating presently preferred embodiments thereof, and wherein:

FIGURE 1 is an edge elevational view of one embodiment of the chewing gum article;

FIGURE 2 is an enlarged sectional view thereof taken substantially along a plane as indicated by the line 2—2 of FIGURE 1;

FIGURE 3 is an elevational view of another embodiment of the invention;

FIGURE 4 is an enlarged longitudinal sectional view thereof, taken substantially along a plane as indicated by the line 4—4 of FIGURE 3;

FIGURE 5 is a top plan view of a third embodiment of the chewing gum item;

FIGURE 6 is a side elevational view of a fourth embodiment thereof, and

FIGURE 7 is a cross sectional view taken substantially along a plane as indicated by the line 7—7 of FIGURE 6.

Referring more specifically to the drawing, FIGURES 1 and 2 show a piece or item 10 composed of a mass of chewing gum 11 encased in a thin coating 12 of a sweet, candy-like substance which effectively seals the chewing gum mass 11 and which is readily soluble so that when the item 10 is placed in the mouth the coating 12 will readily dissolve. The relatively hard chewing gum mass 11 contains a multiplicity of small chambers or cavities 13 each of which is filled with a gas, such as oxygen.

FIGURE 5 shows a chewing gum item, 14, corresponding to the item 10, except that it is of a different shape, and it will be understood that the shape of the chewing gum items may vary substantially so long as the item is sufficiently small so that it can be conveniently placed in the mouth and chewed, yet is sufficiently large so that it includes a substantial mass of chewing gum 11 and which is of sufficient thickness so that it can contain a large number of small gas filled chambers 13.

FIGURES 6 and 7 illustrate still another embodiment of the chewing gum item, designated generally 15, and which is of a long slender shape. The chewing gum mass 16 of the item 15 is encased in a soluble coating 17 and inclues a multiplicity of gas containing chambers 18, all as shown in FIGURE 2 in connection with the item 10. However, the item 15 is additionally shown sealed in a wrapping 19 of metal foil or other similar material which will maintain the chewing gum item fresh. It will be understood that the chewing gum items 10 and 14 may likewise be provided with a wrapper 19, if so desired, and where a wrapper is utilized capable of effectively sealing the chewing gum mass, that the soluble coating may be dispensed with.

The oxygen or other gas utilized may be injected into the chewing gum mass 11 while it is in a soft dough-like condition, by any suitable means such as injection needles, not shown, similar to hypodermic needles, which can be inserted into the gum mass in all directions for injecting the gas at a very low pressure to form gas bubbles which become the gas filled chambers 13 or 18 when the gum mass 11 or 16 has become set or hardened. The coating 12 or 17 can thereafter be applied to the mass of gum.

After the chewing gum item 10, 14 or 15 has been placed in the mouth and the coating thereof has dissolved, the chewing gum mass will be softened by the saliva in the mouth so that it can be chewed. Chewing of the mass will deform and knead it so that the gas filled chambers or bubbles 13 will gradually work to the surface and burst to thereby gradually release the gases into the mouth. If the gas is oxygen, for example, and the mouth is kept closed during chewing, the oxygen can be beneficial to the person chewing the gum especially if such a person suffers from a respiratory ailment such as asthma. The escaping oxygen from the bursting chambers or bubbles 13 or 18 will automatically produce affects similar to those which can be produced by the chewing of conventional bubble gum.

Other gases may be utilized in lieu of oxygen, such as those employed for dispensing foods from pressurized containers and which are not harmful to human consumption, and such gases, or the oxygen, may contain gaseous or vaporized medicants which may be beneficial to the teeth or gums or to other parts of the respiratory system or body, and so that such medicants may be most effectively applied to certain parts of the body and in proper amounts.

FIGURES 3 and 4 show a chewing gum item 20 including a hard chewing gum mass 21 encased in a soluble coating 22. The chewing gum mass 21 has a large chamber or cavity 23 which may be filled with oxygen or other special gas, as heretofore described. The chewing gum mass 21 may be molded to the shape as shown in FIGURE 4 and after it is hardened, the gas may be injected into the chamber 23 by the use of an injection needle, as heretofore described, and the opening, not shown, through which the needle is inserted may be sealed after removal of the needle and prior to applying the coating 22.

The chewing gum item 20 is capable of holding more oxygen or gas than the items 10, 14 and 15; however, as all of the gas in contained in the single chamber 23, it will all be released at the same time, whereas with the items 10, 14 and 15 small amounts of the oxygen or gas are released at any given time so that the entire amount of the oxygen or gas can be released over a considerable period of time.

Various other means may be utilized for injecting oxygen or a gas into a mass of chewing gum, or for impregnating a mass of chewing gum with oxygen or other gas which will be subsequently released from the chewing gum mass as a result of the chewing thereof.

Various other modifications and changes are contemplated and may be resorted to, without departing from the function or scope of the invention as hereinafter defined by the appended claims.

I claim as my invention:

1. A mass of chewing gum containing at least one chamber in which a supply of oxygen under pressure is entrapped, said chamber being adapted to be burst by the kneading of the gum mass due to the chewing thereof for releasing the oxygen from the gum mass into the mouth.

2. A mass of chewing gum containing at least one chamber in which a gas is entrapped under pressure, said gas constituting a carrier for a medicant in a gaseous or vapor form, said chamber being adapted to be burst by the kneading of the gum mass due to the chewing thereof for releasing the medicant containing gas into the mouth.

3. A mass of chewing gum having a gas filled cavity adapted to be ruptured by chewing of the gum mass for releasing the gas therefrom into the mouth.

4. A mass of chewing gum containing a multiplicity of minute gas filled chambers, the chambers being adapted to be burst by the kneading of the gum mass due to the chewing thereof for gradually releasing the gas from the gum mass into the mouth.

5. A chewing gum as in claim 1, and a soluble coating encasing and sealing said gum mass.

6. A chewing gum as in claim 1, and a removable metal foil wrapped enclosing and sealing said chewing gum.

7. A medicinal applicator comprising a mass of chewing gum, and a medicant in a gaseous or vapor form entrapped in the gum mass, said medicant being adapted for gradual release into the mouth by the kneading of the gum mass incident to chewing thereof.

References Cited by the Examiner
UNITED STATES PATENTS

| | | | |
|---|---|---|---|
| 1,396,641 | 11/1921 | King et al. | 99—135 |
| 1,516,398 | 11/1924 | McDowell | 66—135 |
| 2,004,957 | 6/1935 | Messner | 167—82 |
| 2,290,862 | 7/1942 | Canning | 167—82 |

ALBERT T. MEYERS, *Primary Examiner.*

JULIAN S. LEVITT, *Examiner.*

GEORGE A. MENTIS, *Assistant Examiner.*